April 11, 1967 O. JENSEN ET AL 3,314,031
ZERO REACTANCE TRANSFORMER
Filed Feb. 17, 1964 5 Sheets-Sheet 1
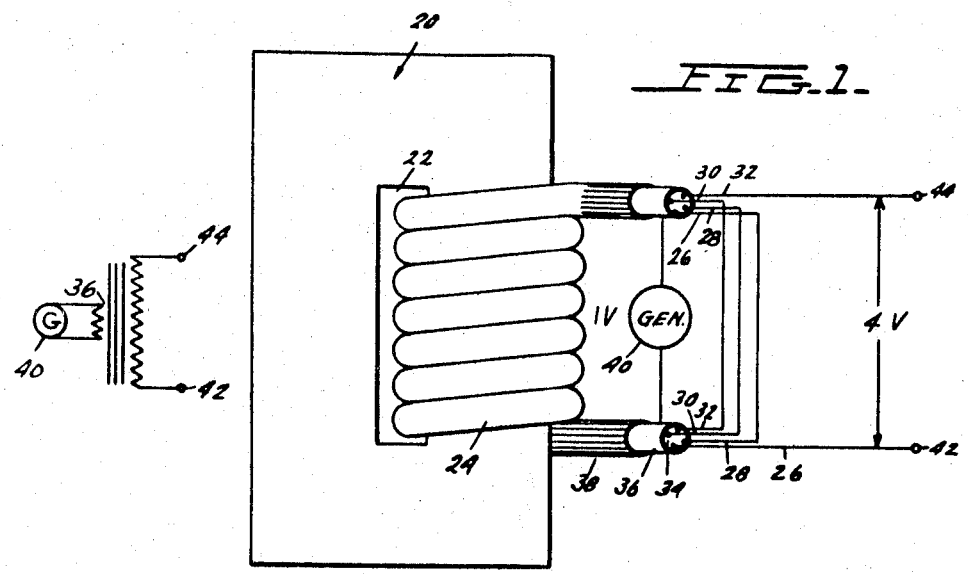
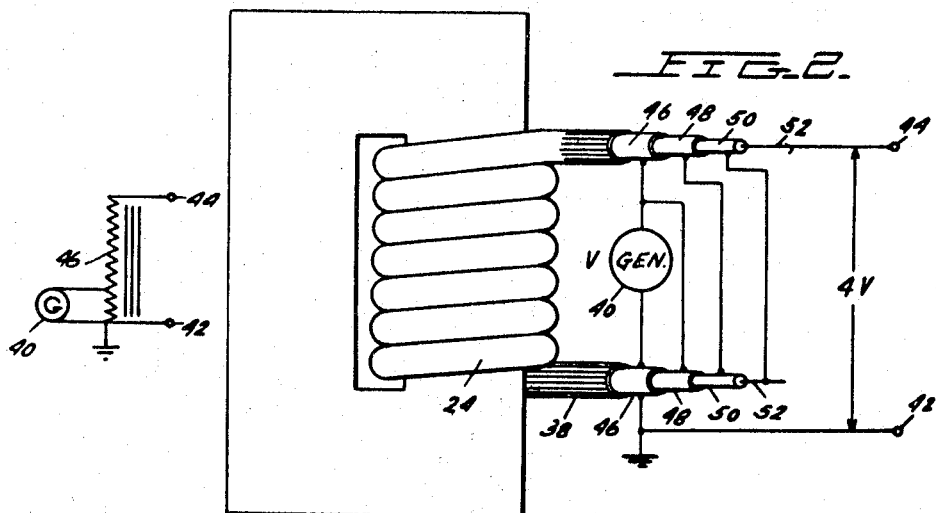
INVENTORS
OTTO JENSEN
ISADORE K. DORTORT
BY
OSTROLENK, FABER, GERB & SOFFEN
ATTORNEYS April 11, 1967  O. JENSEN ETAL  3,314,031
ZERO REACTANCE TRANSFORMER
Filed Feb. 17, 1964  5 Sheets-Sheet 2
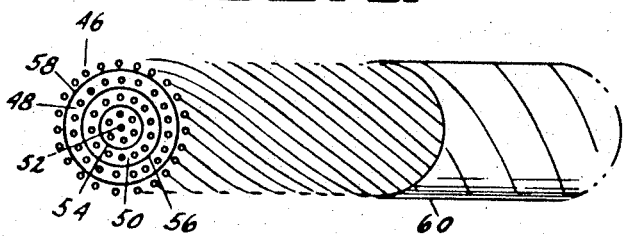
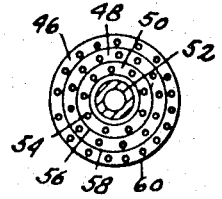
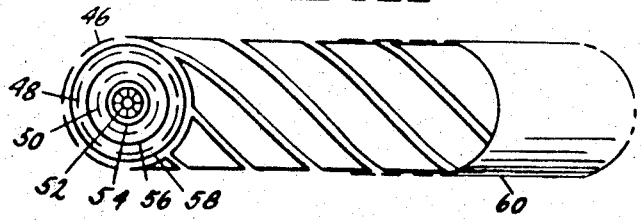
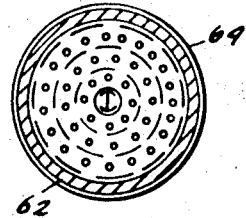
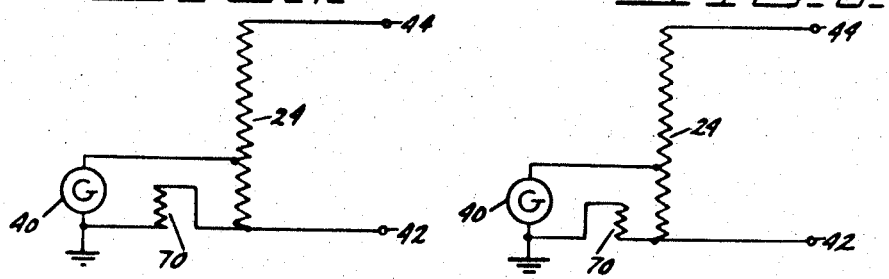
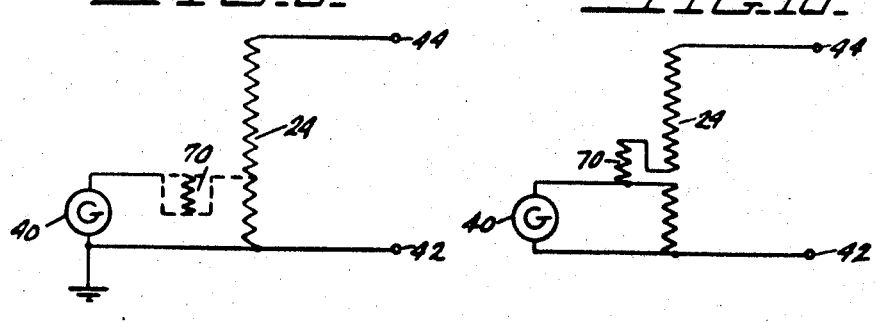
INVENTORS
OTTO JENSEN
ISADORE K. DORTORT
BY
OSTROLENK, FABER, GERB & SOFFEN
ATTORNEYS

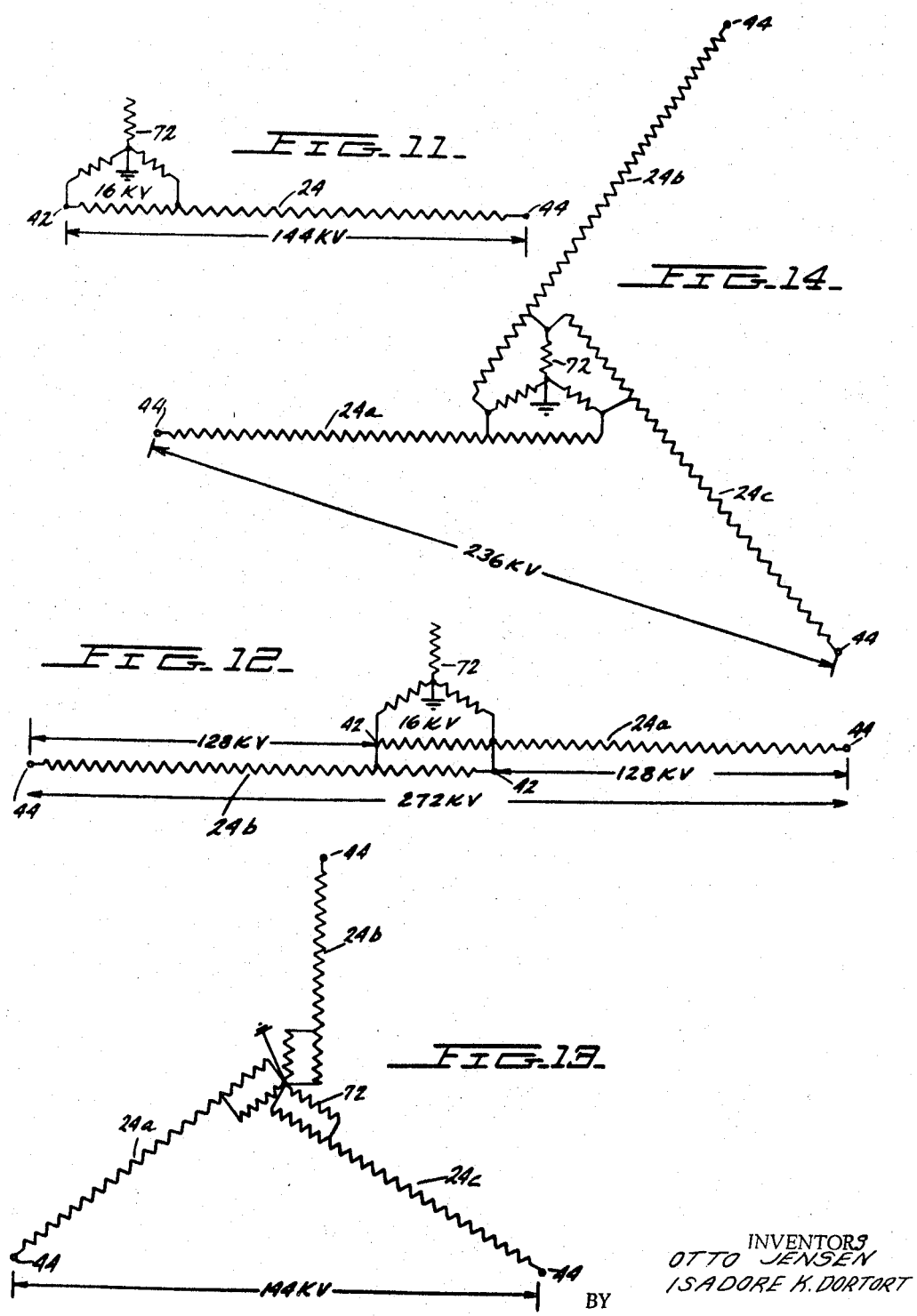

April 11, 1967   O. JENSEN ET AL   3,314,031
ZERO REACTANCE TRANSFORMER
Filed Feb. 17, 1964   5 Sheets-Sheet 4
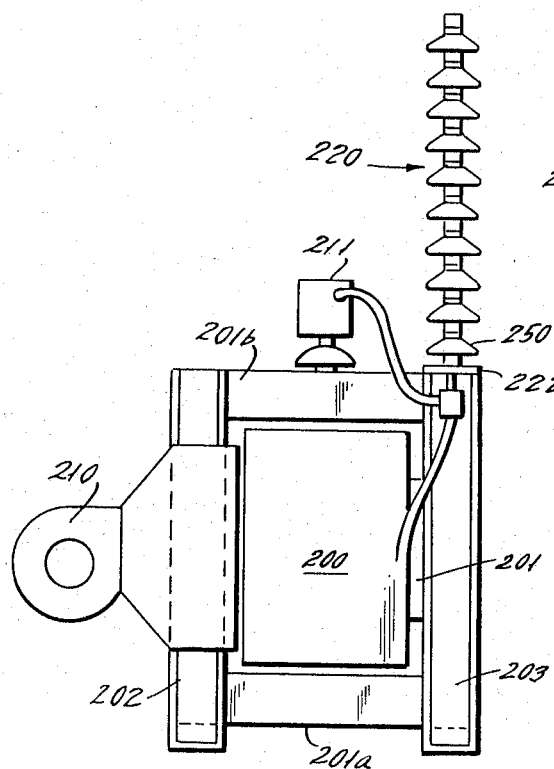
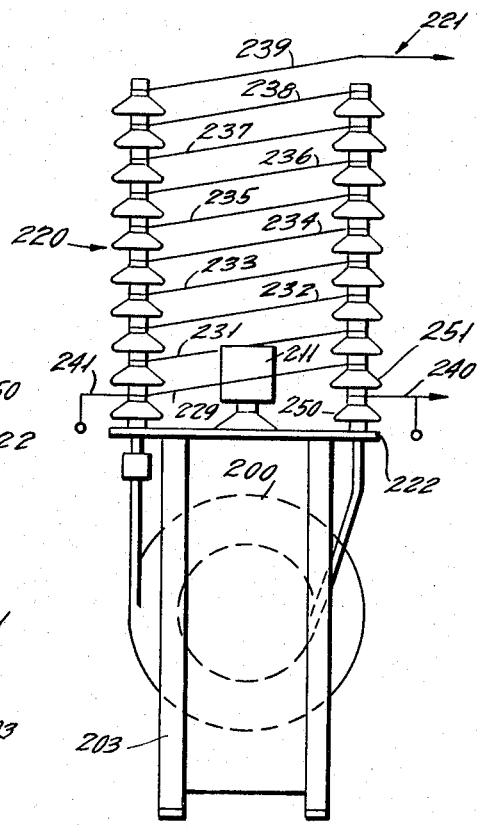
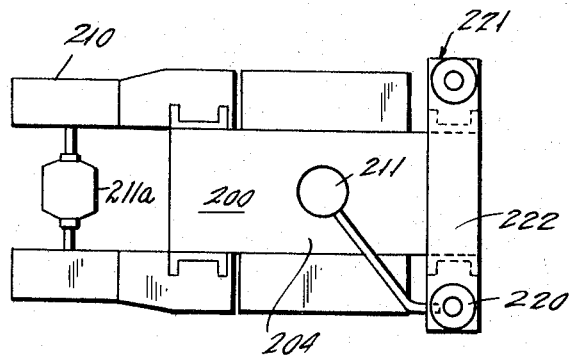
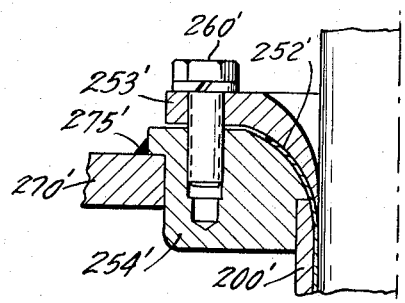
INVENTORS
OTTO JENSEN
ISADORE K. DORTORT
BY
OSTROLENK, FABER, GERB & SOFFEN
ATTORNEYS April 11, 1967 O. JENSEN ET AL 3,314,031
ZERO REACTANCE TRANSFORMER
Filed Feb. 17, 1964 5 Sheets-Sheet 5

INVENTORS
OTTO JENSEN
ISADORE K. DORTORT
BY
OSTROLENK, FABER, GERB & SOFFEN
ATTORNEYS

3,314,031
ZERO REACTANCE TRANSFORMER
Otto Jensen, Malvern, and Isadore K. Dortort, Philadelphia, Pa., assignors to I-T-E Circuit Breaker Company, Philadelphia, Pa., a corporation of Pennsylvania
Filed Feb. 17, 1964, Ser. No. 345,148
2 Claims. (Cl. 336—195)

This invention relates to a transformer having zero, or substantially zero, reactance and is a continuation-in-part application of copending application Ser. No. 808,520, now abandoned, filed Apr. 23, 1959, in the name of Otto Jensen and Isadore K. Dortort and entitled, "Zero Reactance Transformer."

In many applications it is desirable to have a power transformer whose impedance, and particularly its leakage reactance, should be as low as possible. Typical of these applications are pulse transformers for radar circuits, high energy pulse generators, and transformers for short circuit testing generators in high power circuit breaker testing laboratories.

For illustrative purpose, the following illustrates the manner in which a substantially zero reactance transformer would be of great value in a short circuit testing system for high power circuit breakers.

Generators in short circuit testing systems are generally designed for an output voltage 14 to 18 kv. and to deliver as much power as economically feasible to the circuit breaker under test. Generators with a short circuit capacity of 1,000,000 kva. are not unusual and, considering the very short aggregate time of operation during their life, they are extremely expensive. It is, therefore, of prime importance not to dissipate any of the generator's capacity in intermediate apparatus; otherwise, the cost of delivering the desired power to a circuit breaker under test is greatly increased due to the increased requirements in generator capacity, transformers, etc.

If the testing is being done at generation voltage, the problem is not very difficult. If, however, the breaker to be tested is rated, for example at 220 kv., a large step-up transformer is required. These high voltage transformers have considerable impedance which adds almost directly to the generator impedance and greatly reduces the power transmitted from the generator to the test breaker. They are exceedingly expensive because they must be designed not only for the thermal and mechanical stresses imposed by repeated short circuits, but especially because their impedance cannot be reduced except by increasing physical size. For example, assume that a test generator with a rated voltage of 16 kv., a short circuit rating of 1,000,000 kva., and a phase to neutral subtransient reactance of 0.223 ohm is available. To deliver 1,000,000 kva. to a high voltage three-phase circuit breaker, the step-up transformers would be permitted to have an impedance of not over 0.034 ohm. If this represents 6% impedance in an equivalent three-phase transformer, the kva. rating of this transformer would be approximately 450,000 kva.

If the generator were short circuited without any external impedance it would deliver 15% more current than the rating for which it is thermally and mechanically designed. If, on the other hand, it were given a margin of 25%, its substransient reactance would be only 0.206 ohm and the step-up transformer bank connected to it would have an impedance of not over 0.051 ohm. On the basis of 6% impedance this transformer bank would have an equivalent rating of 300,000 kva. or, in other words, 150,000 kva. less than in the first example. However, to obtain the lower generator impedance, the generator would have to be physically larger in the ratio of approximately 1,250,000/1,150,000 and the total installation would probably be more expensive since generator kva. costs more than transformer kva. Note that the transformer in the first example would, if connected to an infinite source, delivery approximately 7,500,000 kva., whereas the second transformer bank under the same condition would deliver 5,000,000 kva. These examples are cited to emphasize the cost of transformer impedance in a high power test installation.

A transformer built with essentially zero leakage reactance and low resistance would permit the use of a minimum size generator with excess capacity only sufficient to overcome the impedance of external connections. The resistance of the transformer winding, added vectorially to the essentially reactive impedance of the generator would cause almost no reduction in the current delivered to the test specimen.

The general principle of this invention is to produce a substantially zero reactance transformer by constructing the transformer windings coaxially with respect to one another so that the coaxial group is wound as a single winding, and after the winding is completed, they are externally connected as desired.

By way of example, a plurality of individual conductors which are electrically insulated from one another and lie mechanically parallel to one another are wound as a single group. After this single group has been wound as though it were a single conductor, the end of a first conductor is used as a first output terminal, and its other end is connected to the beginning of the second parallel conductor. The opposite end of second parallel conductor is then electrically connected to the first end of a third parallel conductor, and so on, until the last end of the last conductor is taken out as the other terminal of the composite winding. Since the conductors are in such physically close proximity to one another, it will be apparent to those skilled in the art that the leakage reactance of the unit will be substantially zero.

Clearly, the individual conductors could be combined in many different manners so that they may be solid conductors positioned adjacent one another and insulated from one another, or could be coaxially positioned with respect to one another to further decrease leakage reactance.

The highest voltage occurs at the center conductor and decreases in uniform steps, layer by layer, to the lowest potential on the outside conductor. Potential gradients are all radial and uniform in each layer of insulation. In this respect, the coaxial multiple conductor cable is similar to a condenser bushing except that voltage distribution is rigidly fixed and not dependent on capacitance.

Because of the concentric arrangement of conductors, all mechanical forces due to short circuit currents are locked up within the cable and there are no axial or radial stresses on any turn or turns of the transformer winding, thus eliminating one of the major problems in the usual transformer design.

An important feature of the present invention is to provide a pagoda type termination bushing wherein the coaxial cable can be received in the bushing with the various layers being electrically connected to novel clamping structures which clamp the insulator stack together. This then provides a novel means for making connection between the various coaxial conductor layers to place them in series relation.

A further object of this invention is to provide a novel terminal structure for a coaxial transformer winding.

Yet another object of this invention is to provide a novel pagoda type cable termination for coaxial cable type transformers.

Accordingly, a primary object of this invention is to provide a low reactance transformer.

Another object of this invention is to provide a novel transformer which will absorb substantially zero energy in the system in which it is connected.

Another object of this invention is to form the conductors of winding sections of a transformer concentric with one another.

A further object of this invention is to form a novel transformer in which a plurality of conductors are wound as a single winding and are thereafter connected to one another so that each of the physically parallel conductors are electrically connected in series to form an electrical winding of a number of turns greater than the number of physical turns of each individual conductor.

A further object of this invention is to provide a novel transformer for large power applications which is small and economical.

These and other objects of this invention will become apparent from the following description when taken in connection with the drawings, in which:

FIGURE 1 illustrates a first embodiment of this novel invention for a two winding transformer.

FIGURE 2 illustrates this novel invention as an auto-transformer where the various conductors of the composite winding are coaxial members.

FIGURE 3 illustrates a first manner in which the composite cable of FIGURE 2 may be formed of spiral wound, round conductors.

FIGURE 4 shows a second manner in which the winding of FIGURE 2 can be formed by metallic tape.

FIGURE 5 illustrates the manner in which the tubular conductor of FIGURES 3 and 4 could be modified with a central tubular conductor which is adapted to conduct a cooling medium.

FIGURE 6 shows another manner in which the cable of FIGURE 3 could be formed so as to conduct a coolant.

FIGURE 7 is a circuit diagram which illustrates one manner in which the output voltage of the transformer constructed in accordance with our novel invention may be regulated by means of a trimmer winding by reducing the volts per turn.

FIGURE 8 is similar to FIGURE 7 where the trimmer coil is wound to boost the output voltage.

FIGURE 9 is similar to FIGURES 7 and 8 and shows the trimmer coil at the potential of the outside layer of the coaxial winding.

FIGURE 10 is similar to FIGURES 8 and 9 where the trimmer coil is connected to boost the output voltage without increasing the volts per turn of the winding.

FIGURE 11 illustrates one manner in which a single phase transformer constructed in accordance with this invention can be used with a three-phase generator to obtain a single phase output voltage with a minimum cost of transformer equipment.

FIGURE 12 is similar to FIGURE 11 and illustrates a manner in which a single phase output of almost double voltage is obtained by the use of two single phase transformers of the invention which are driven by a three-phase generator.

FIGURE 13 shows the manner in which a three-phase generator may be associated with three single phase transformers constructed in accordance with the present invention to obtain a three-phase output.

FIGURE 14 is similar to FIGURE 13 and illustrates a further manner of how a three-phase generator can drive the same three single phase transformers constructed in accordance with the invention to obtain a three phase output of higher voltage.

FIGURE 15 is a side plan view of a transformer structure formed in accordance with the invention.

FIGURE 16 is a top view of FIGURE 15.

FIGURE 17 is a side plan view of the arrangements of FIGURE 15 and, particularly, illustrates the novel pagoda type cable termination structure.

FIGURE 18a is a partial view of a modification of FIGURE 18 showing the cable sheath joined to a tube which is welded into the lower clamping ring rather clamping it to the ring.

Figure 18:
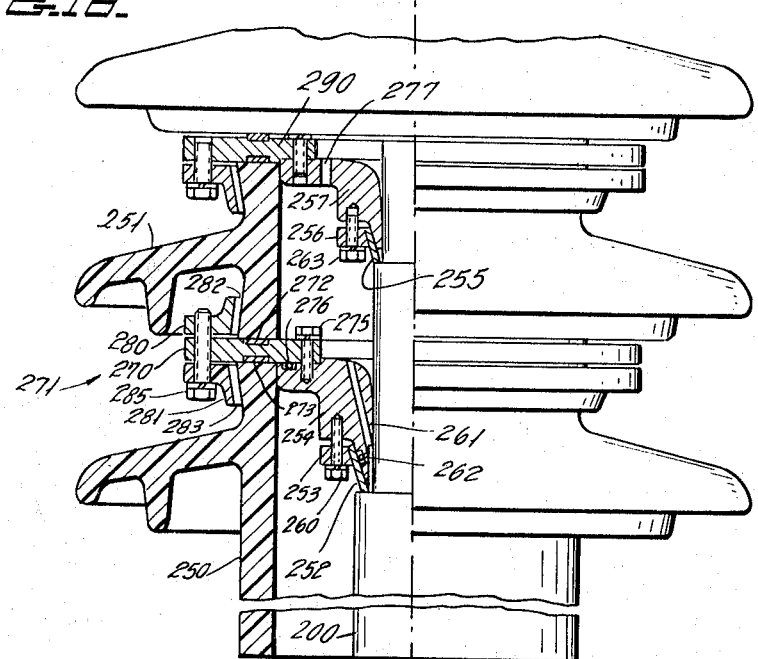
FIGURE 18 is a cross-sectional view of the insulator and clamp construction used for the pagoda type cable termination of FIGURES 15 through 17.

In a first embodiment of this invention, as shown in FIGURE 1, a transformer core 20, which is constructed in accordance with the usual techniques, has a window 22 which receives composite winding 24 which is formed in accordance with the present invention.

The composite winding 24, as is schematically illustrated, has seven turns and is formed of four physically parallel conductors 26, 28, 30 and 32. These individual physically parallel conductors 26 through 32 are contained in an insulating medium 34 and are insulated from one another, as will be seen more fully hereinafter, and are surrounded by a hollow conductive sheath 36 which acts as a primary winding for the transformer. The sheath 36 is then covered with an insulating sheath 38 which insulates adjacent turns of winding 24 from one another.

As schematically illustrated to the left of FIGURE 1, an A.-C. generator 40 is connected across the primary winding 36. The physically parallel conductors 26 through 32 form the secondary winding and are externally sequentially connected in series so that the secondary winding is comprised of four times seven, or twenty-eight turns. Therefore, if the generator voltage is V, the output secondary voltage is 4V. This connection of the individual conductors of the secondary winding is more specifically seen in FIGURE 1 to run as follows:

The first terminal of conductor 26 forms the lower terminal 42 of the secondary winding. Conductor 26 then is taken through the seven turn winding and emerges at the top of the winding and is then externally connected to the lower end of conductor 28. Conductor 28 then runs through the seven turns of the winding and emerges at the upper portion of the winding, and is then connected to the lower end of conductor 30. Conductor 30 then runs through the seven turn winding and emerges at the upper part of the coil, and is thereafter connected to the lower end of conductor 32. Conductor 32 finally runs through the seven turn winding to complete the twenty-eight turn secondary and thereafter emerges at the top of the winding, and is terminated at upper terminal 44.

Accordingly, a step-up transformer is provided in which the leakage reactance, because of the configuration of the windings, is substantially zero.

The above FIGURE 1 schematically illustrates this novel transformer structure as a two winding transformer. If desired, an auto-transformer connection may be used to increase the economy of the unit. This is illustrated in FIGURE 2 which further specifically illustrates the preferred winding as formed of concentric conductors for the physically parallel conductors of the winding.

In FIGURE 2, winding 24 is formed of concentric conductor elements 46, 48, 50 and 52 which correspond to conductors 26, 28, 30 and 32 respectively of FIGURE 1. The generator 40 in FIGURE 2 is connected across the first tubular conductor 46 which serves as the primary of the auto-transformer shown. The secondary winding is formed by the external connections between conductors 46 through 52 which runs from the lower end of conductor 46 to the upper end of conductor 46 to form the first seven turns. The upper end of winding 46 is then connected to the lower end of winding 48, and the connection then again goes through the seven turn winding to the upper end of winding 48. The upper end of winding 48 is then connected to the lower end of winding 50 which again goes through the seven turns to emerge at the upper end of winding 50. The upper end of winding 50 is then connected to the lower end of winding 52 which goes through the seven turns winding to complete the twenty-eight turns, and the conductor emerges at the upper end of winding 52.

As was the case in FIGURE 1, the upper end of winding 52 emerges to terminal 44, while the lower end of winding 46 emerges as terminal 42. Similarly, the complete composite unit is covered with an insulating sheath 38, while the various concentric conductors are insulated from one another in any desired manner.

In forming the composite conductors of FIGURES 1 and 2, many techniques may be employed.

In FIGURE 3 a typical possible construction is shown where the cable is made of spiral wound, round conductors. In this case, the innermost conductor 52 of FIGURE 2 is seen in FIGURE 3 as being formed by the innermost group of spiral wound, round conductors 52. Innermost conductor 52 is then covered with an insulation medium 54, and a second layer of spiral wound, round conductors 50 forms the conductor 50 of FIGURE 2. Once again, an insulating sheath 56 is wound on conductor 50, and the concentric wound, round conductor layer 48 is wound on insulation 56. A further sheath of insulation 58 is wound on top of conductors 48, and sheath 58 supports the final layer of conductors 46 which form the outermost tubular conductor 46 of FIGURE 2. The complete assembly is then covered by insulation sheath 60 so that the complete composite conductor is formed.

While FIGURE 3 shows the use of spiral wound, round conductors for forming the conductive elements, a metallic tape may be used instead of the round wires, as is schematically illustrated in FIGURE 4.

In FIGURE 4, the conductive elements 46, 48 and 50 are of metallic tape, while the innermost conductor 52 may be a round conductor. As was the case in FIGURE 3, the conductive layers are insulated from one another by insulator layers 54, 56 and 58 with insulating sheath 60 completing the cable.

FIGURE 5, which is a side cross-sectional view of a conductor similar to the conductor of FIGURE 3, further illustrates that the central conductor 52 can be formed of a tubular conductor where the tube may be used to conduct a cooling medium such as oil to carry away the internal heat of the conductor.

The insulation between the various conductive layer of FIGURES 3, 4 and 5 has been described as being of any desired type. Thus, it may be in the form of an extruded plastic jacket, a wound paper tape, or a cloth or plastic tape, or any of the well known and commonly used insulating materials. Certain plastic materials, such as polyethylene, can be irradiated after the coil is formed to provide greater electrical strength. Insulation over the sheath conductor to form layer 60 can be in the form of an extruded plastic, varnish, enamel, glass or cloth tape. It need only be sufficient to withstand the turn-to-turn voltage of the transformer secondary winding, and have sufficient mechanical strength to withstand the coil winding operation.

For very high voltage, we have found that paper insulated cable in combination with high or low pressure oil systems is suitable for the operation of the system. This leads itself, as is shown in FIGURE 6, to using a sheath 62 which may be of aluminum over the type of cable shown in FIGURE 3. The composite conductor may then be impregnated with oil which is contained by sheath 62. The aluminum sheath is subsequently surrounded by another insulating wrapping 64 to prevent short circuiting of the turns when the winding is wound. The transformer may then be made essentially a dry type transformer even for very high voltages, with the oil being contained within the cable. The central conductor can readily be formed with channels to permit the rapid equalization of oil pressures.

Since the jacket 62 is a conductive member, it is clear that it could be used as another winding of the secondary, or as a primary winding. Furthermore, instead of being formed as a sheath, it may be desirable that it be formed of a stranded conductor with the entire core and coil immersed in a tank of insulating oil, as is well known in the art. Still further, if the transformer is to be made completely dry, it is clear that it can be enclosed in a hermetically sealed case which could contain some inert gas, or some high dielectric gas, such as sulphur hexafluoride.

It is obvious that the low voltage primary winding will have the largest cross section. If, as in most cases, it is desirable to tap the high voltage winding, the current ratings of the internal conductors will be graded according to the current they will deliver at their tap. If a tap is provided at each conductor terminal, the grading will be uniform and achieved naturally by the increasing diameter of the conductor.

In the case of a test transformer, the duty cycle is extremely short and the cross section of each conductor is so dimensioned that the total heat generated in the conductor during the test will raise the temperature of the conductor to a maximum safe value.

Since the output voltage at any particular tap is equal to the generator voltage times the number of conductors in use, the output voltage of the transformer is available only in discreet steps, if the maximum output of the generator is required. A relatively small low impedance auto-transformer can be inserted between the generator and the test transformer to obtain fine adjustment. However, it may be desirable to place a small buck or boost trimmer winding on the main transformer on the grounded or ungrounded side of the primary winding as shown in FIGURE 7. This trimmer winding will introduce some leakage reactance and some mechanical force. However, since it will be designed only for minor adjustments, those effects can be held to a minimum.

In FIGURE 7, the trimmer coil 70 is connected between generator 40 and secondary winding 24, and is connected in a direction to reduce the output voltage of winding 24 at terminals 44 and 42. If desired, the trimmer coil of FIGURE 7 may be wound over the coaxial winding in an obvious manner.

In FIGURE 8, the trimmer coil 70 is shown wound in a direction to boost the output voltage at terminals 42 and 44, and the volts per turn are increased.

FIGURE 9 is similar to FIGURES 7 and 8 where the trimmer coil is connected at the potential of the outside layer of the coaxial winding such as outer conductor 46 in the embodiment of FIGURE 2, assuming, however, that the coil is wound in multiple layers, with ground potential at the start of the innermost layer in accordance with usual practice.

In FIGURE 10, the trimmer coil is connected to boost the output voltage without increasing the volts per turn by being connected directly in series with the secondary winding circuit.

FIGURE 11 illustrates one manner in which a three-phase generator 72 may be used to drive one single phase transformer constructed in accordance with the embodiment of FIGURE 2 having winding 24. In FIGURE 11, the phase-to-phase voltage of generator 72 is 16 kilovolts whereby the auto-transformer connected across the phase-to-phase voltage of generator 72 will generate a voltage of 144 kilovolts between terminals 42 and 44, assuming that nine concentric conductors are used instead of the four shown.

Generally a three-phase generation will be provided with three single phase transformers which can be used in various combinations, as described in the following to meet various test requirements at maximum power.

In the embodiment of FIGURE 12, generator 72 is connected to the two single phase transformers constructed in accordance with the embodiment of FIGURE 2, and having windings 24a and 24b where the potential between terminal 44 of winding 24a and terminal 44 of winding 24b will be 272 kilovolts.

In FIGURE 13, the generator 72, which has a voltage of 9.25 kilovolts to neutral, and three single phase transformers having windings 24a, 24b and 24c respectively are connected in the generator 72, as illustrated in FIGURE 13. This type of connection will result in a 144 kilovolts balanced three-phase voltage appearing between terminals 44 of the three windings 24a, 24b and 24c.

A final typical manner in which the transformer may be connected is shown in FIGURE 14 which illustrates the so-called three-phase pinwheel connection. In this type of connection between the three-phase generator 72 and the three individual single phase transformers including windings 24a, 24b and 24c, there will be a voltage of 236 kilovolts between terminals 44 of the various secondary windings.

It will be recognized from the foregoing that the manner in which cable termination is made can be an extremely complex problem. By way of example, the patent to Wertanen 3,005,965 illustrates a coaxial conductor arrangement wherein one or more pairs of coaxial tubes are wound in a single turn. The ends of these coaxial conductors are thereafter connected in a relatively complex manner.

An important feature of the present invention is to provide a novel terminal structure for such coaxially arranged windings which simplifies the interconnection between the various coaxial conductor layers.

The novel termination structure of the invention is schematically illustrated in FIGURES 15, 16 and 17 which illustrate a transformer constructed in accordance with the invention as forming a winding of coaxial cable 200 which can, for example, have nine coaxial conductor layers.

The winding 200 which may be of the type shown in any of the FIGURES 3 through 6 is then wound on a magnetic core (partially shown by central core section 201, and core legs 201a and 201b) and may be completed in the standard manner. A main support structure is then provided which includes beams 202 and 203 and a top support 204 (FIGURE 16). A blower 210, driven by motor 211a (FIGURE 16), is then provided with its outlet immediately adjacent winding 200 for providing a strong forced flow of cooling air for the system.

In addition and where the cable forming winding 200 is of the oil filled type, an oil pressure reservoir 211 is provided for supplying oil to the cable as schematically illustrated.

A pagoda type pair of terminals 220 and 221 formed of a plurality of insulator sections, which are clamped together in appropriate manner, is then supported on a support base 222. Electrical conductors from within coaxial cable forming winding 200 then pass through hollow interior of the two stacks 220 and 221 which will be described more fully hereinafter, and terminate at appropriate locations so that they will be interconnected by the cross-over conductor bars 229 through 238.

Three connection terminals 239, 240 and 241 are also provided for the pagoda terminal members wherein primary voltage may be connected between terminals 240 and 241 and secondary voltage may be taken from terminals 240 and the conductor 239. In this regard, the connection shown for the transformer of FIGURES 15, 16 and 17 is similar to the autotransformer arrangement of FIGURE 2 which differs therefrom in only that nine coaxial conductors are used in FIGURES 15, 16 and 17.

Figure 19:
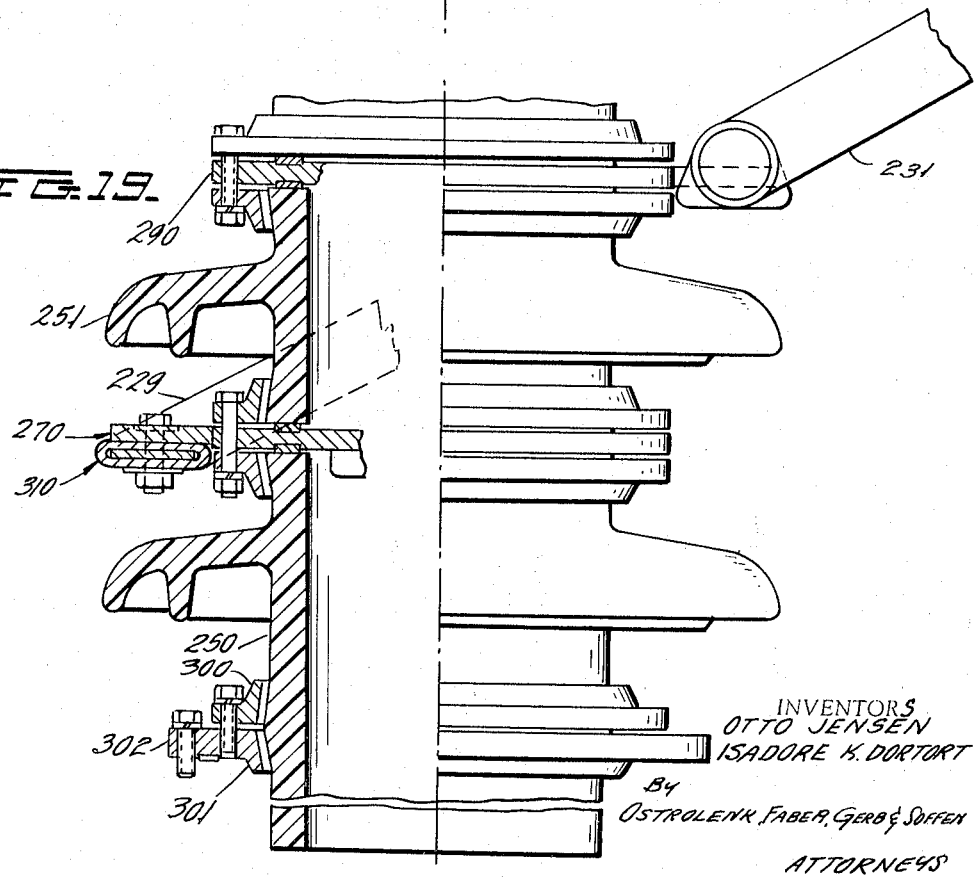
FIGURE 19 is a cross-sectional view of a bushing similar to that of FIGURE 18 and further shows the connection to a conductive bus and a bottom mounting flange.

The manner in which the pagoda type terminal arrangement is constructed is shown in FIGURES 18 and 19.

In FIGURE 18 there is more particularly illustrated the bottom-most insulator 250 of stack 220 and the next adjacent insulator 251 of the stack. Each of the insulators 250 and 251, as well as all the remaining insulators of the stack, are hollow and receive the cable 200 therein. The outermost cable conductor layer or sheath 252 is then flared outwardly, as illustrated, to be received between a ring shaped clamp 253 and a clamp conductor 254.

The next outermost conductor 255 continues upwardly through the stack and is finally flared outwardly, as illustrated, when it reaches clamping ring 256 and conductive clamping ring 257. The clamping rings are shaped to reduce the potential gradients along the next lower insulating layers.

In a similar manner the cable 200 continues upwardly of the stack with the various conductive layers being outwardly flared as they reach their respective bushing section.

The outermost conductive cable section 252 is electrically connected to conductive clamp 254 by means of the ring 253 which is secured to clamp 254 by a suitable bolting arrangement which includes bolt 260. Where the cable 200 is of the oil filled type with the cable sealed from the atmosphere or from the liquid or gas contained in a tank housing the transformer coil, the outer conductor 252 is, of course, a continuous solid wall tube. The clamp section 254 will have a plurality of passages, such as passage 261, therein which permits communication and easy oil flow between the interior of the next higher bushing section, such as section 251, and the oil space inside the cable sheath next to the layer of insulation over the next inner conductor. Thus, it will be seen that a closed circulation path will exist from oil reservoir 211 through the interior of insulator stack 220 and 221 and through the cable 200.

Preferably a suitable circular gasket 262 is placed between conductor 252 and clamp 254.

A similar clamping arrangement is then provided for each of the other coaxial strands. Thus, the clamping ring 256, which may be identical to clamping ring 253, is bolted in conductive clamp 257 by bolts similar to bolt 263. Clearly, clamp 257 can be identical to all of the remaining clamps serving a similar function for all of the conductive layers of cable 200. However, since conductor 255 is stranded, passage 277 may be a simple straight passage.

Each of the junctions between insulator sections, such as insulator sections 250 and 251, are then provided with a metal annular plate, such as plate 270, which is clamped between insulators 250 and 251 by the clamping means 271. Suitable ring shaped gaskets 272 and 273 may be used to insure a good pressure seal between insulator sections. The metal plate 270 is then connected to its respective coaxial layer of cable 200 by a bolt arrangement which could include bolt 275 which secures conductive clamp member 254 to disc 270. A gasket 276 can be placed as shown to insure a good pressure tight seal. Note that all of the other conductive clamp members, such as clamp 257, will additionally have an oil passage 277 therein to permit flow of oil into channel 261 and the cable sheath from the uppermost portions of the bushing stack.

The main clamp 271, which will be of identical structure for each of the adjacent insulator sections, includes flange rings 280 and 281 and cement filters 282 and 283 respectively which bond flange rings 280 and 281 firmly to the outer tapered surfaces of the insulators 250 and 251 respectively. A plurality of bolts, such as bolt 285, then tighten insulators 250 and 251 against gaskets 273 and 272 respectively to rigidly secure the adjacent insulators 250 and 251 to the annular plate 270.

It will now be apparent that once the stack is completed, as described above, that the electrical connections, shown in FIGURE 17 and including conductors 229 through 241, can easily be made to the various conductive plate sections, such as conductive plate 270 which is electrically connected to the outer sheath 252. Note that conductive plate section 290 will be electrically connected to the next interior concentric conductor 255 and so on up the stack.

FIGURE 19, which is similar to FIGURE 18, further illustrates a mounting flange means for the bottom of the stack to the top plate of a transformer tank which may be gas or liquid filled.

More particularly, the mounting flange includes rings, such as rings 300 and 301. Ring 300 is identical to ring 280 while ring 301 is similar to ring 281, but has a bolt flange 302 extending therefrom for reception of a cooperating support structure on the transformer top plate (not shown).

FIGURE 19 further illustrates the manner in which the cross-bar conductors are connected to the bushing. Thus, conductor 229 is a tubular conductor having a flattened end portion electrically and mechanically received by clamp 310 which is electircally and mechanically connected to plate 270.

In a similar manner, the end of conductive tube 231 is flattened, as schematically illustrated, for connection to plate 290. Note that alternate cross-conductors can be received on alternating sides of the bushing.

Although there has been described a preferred embodiment of this invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A transformer winding comprising a plurality of coaxial tubular conductors insulated from one another by a plurality of respective tubular insulation sheaths; said plurality of coaxial conductors being wound as a unitary winding to form at least two turns; and a plurality of cross-over terminal conductors for connecting each of said plurality of adjacent conductors in series with one another; each of said plurality of coaxial conductors having first adjacent ends and second adjacent ends; each of said first ends of each of said coaxial conductors being connected to a respective second end of one of said coaxial conductors immediately adjacent and interior of each of said respective coaxial conductors by a respective cross-over terminal conductor of said plurality of cross-over terminal conductors; each of said first and second ends being elongated; said coaxial conductors being sequentially exposed from their said insulation sheaths along the axis of said elongated ends; and a first and second plurality of hollow stacked insulators; each of said first and second ends being respectively received by said first and second plurality of hollow stacked insulators; and a plurality of clamping means for clamping each of said stacked insulators to one another; one end of each of said coaxial conductors and one end of each of said cross-over conductors being electrically connected to one another by said clamping means.

2. The device substantially as set forth in claim 1 wherein each of said clamping means includes conductive disc means interposed between adjacent insulators to be connected, a conductive ring means connected to said disc, and first and second clamping rings respectively connected to said adjacent insulators; first and second said clamping rings connecting said adjacent insulators and said conductive disc to one another; said conductive ring means being connected to its respective end of one of said coaxial conductors.

References Cited by the Examiner
UNITED STATES PATENTS

| | | | |
|---|---|---|---|
| 633,855 | 9/1899 | Lamme | 323—45 |
| 665,305 | 1/1901 | Berry | 336—195 X |
| 1,130,268 | 3/1915 | Haefely | 336—94 X |
| 2,011,663 | 8/1935 | Tubbs | 323—45 |
| 2,355,560 | 8/1944 | Roberds | 336—62 |
| 3,005,965 | 10/1961 | Wertanen | 336—195 X |
| 3,197,723 | 7/1965 | Dortort | 336—195 |

LEWIS H. MYERS, *Primary Examiner.*

T. J. KOZMA, *Assistant Examiner.*